United States Patent
Kobayashi et al.

[11] Patent Number: 5,914,073
[45] Date of Patent: *Jun. 22, 1999

[54] PROTECTIVE FILM FOR POLARIZING PLATE

[75] Inventors: Toru Kobayashi; Naoko Morita; Koichi Nagayasu; Isamu Michihata; Masaji Nara, all of Hino, Japan

[73] Assignee: Konica Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/686,722

[22] Filed: Jul. 26, 1996

[30] Foreign Application Priority Data

Aug. 11, 1995 [JP] Japan .................... 7-205758

[51] Int. Cl.$^6$ .............. F21V 9/14; G02B 5/30; B32B 27/30
[52] U.S. Cl. .................... 252/585; 359/485; 428/327; 428/328; 428/329; 428/331; 428/341; 428/483; 428/522
[58] Field of Search ............ 252/585, 582; 522/83, 93; 428/522, 412, 510, 341, 483, 327, 328, 329, 331

[56] References Cited

U.S. PATENT DOCUMENTS

| | | | |
|---|---|---|---|
| 4,230,768 | 10/1980 | Hamada et al. | 428/352 |
| 4,427,741 | 1/1984 | Aizawa et al. | 428/332 |
| 4,839,337 | 6/1989 | Imai et al. | 503/227 |
| 4,977,028 | 12/1990 | Goepfert et al. | 428/426 |
| 5,075,348 | 12/1991 | Revis et al. | 522/84 |
| 5,213,852 | 5/1993 | Arakawa et al. | 428/1 |
| 5,262,450 | 11/1993 | Vara et al. | 522/83 |
| 5,478,869 | 12/1995 | Takahashi et al. | 522/77 |

FOREIGN PATENT DOCUMENTS

| | | |
|---|---|---|
| 0538866 | 4/1993 | European Pat. Off. |
| 0727471 | 8/1996 | European Pat. Off. |
| WO9212186 | 7/1992 | WIPO |

OTHER PUBLICATIONS

JP-A-61 036 335 –Abstract only, (1986).
JP-A-04 004 219 –Abstract only (1992).
JP-A-06 136 148 –Abstract only, (1994).
JP-A-57 195 208 –Abstract only, (1982).
European Search Report EP 96 30 5806, (1986).

*Primary Examiner*—Philip Tucker
*Attorney, Agent, or Firm*—Jordan B. Bierman; Bierman, Muserlian and Lucas

[57] ABSTRACT

A protective film for a polarizing plate comprises a resin film, and provided thereon, a layer comprising a polyol acrylate resin.

19 Claims, 1 Drawing Sheet

5,914,073

PROTECTIVE FILM FOR POLARIZING PLATE

FIELD OF THE INVENTION

The present invention relates to a protective film for a polarizing plate and particularly to a cellulose ester film, which is widely used in cases requiring optical properties such as a polarizing plate for a liquid crystal displaying device, providing its durability and further providing scratch, chemical and glare resistance to protect a liquid crystal substance.

BACKGROUND OF THE INVENTION

The cellulose ester film, particularly a cellulose triacetate film, is widely used for optical applications such as a polarizing plate, since film having sufficient transparency and a small anisotropy in refractive index can be easily prepared from the cellulose ester.

The attempt to prepare a polarizing plate having excellent scratch, chemical and glare resistance has been made by using an improved polyester protective film for a polarizing plate in which the protective film is applied with an iodine type or two color dye type polarizing film.

The liquid crystal displaying device employing such a polarizing plate does not require an extra protective film or plate for the polarizing plate, and therefore, a displaying device which is light, thin and highly discriminating can be obtained.

The liquid crystal displaying device is used for a displaying panel of calculators, watches, portable TV's, personal computers, and gauges for cars. As a displaying panel is increased, reduction of the thickness or weight of such a displaying device is an important object in addition to high quality image and full color image.

In conventional liquid crystal displaying devices, the displaying panel has a glass plate or a plastic plate on the surface, since the polarizing plate is poor in scratch and chemical resistance.

In Japanese Utility Model O.P.I. Publication No. 54-130441/1979 and Japanese Patent O.P.I. Publication No. 1-105738/1989 is disclosed a method for providing scratch and chemical resistance comprising adhering a polarizing film to a transparent plastic film through an adhesive and providing, on the resulting film, a resin film such as a polyester acrylate resin, a (meth)acrylate resin or an acrylurethane resin, which are then hardened. However, this method has problems in that the protective film is required and the polarizing plate itself is thick, resulting in increased weight.

Japanese Utility Model O.P.I. Publication No. 54-130441/1979 also discloses a method for enhancing scratch resistance employing evaporated $SiO_2$ deposits, silicone type upsite and phenol resins, but the surface hardness or adhesion of the plastic plates is not fully satisfactory.

In Japanese Patent O.P.I. Publication No. 1-105738/1989 is disclosed a method for providing scratch and chemical resistance comprising providing on one side of an unsaponified triacetate film a hardened layer of a UW hardenable epoxyacrylate resin. However, in this method, the coating layer thickness increase, to enhance the surface hardness, is likely to cause cracks and adhesion between the polarizing plate and the coating layer deteriorates under high temperature and high humidity, since saponification can not be conducted.

In the above described polarizing plate, strong adhesion between the polarizing film and the protective film are required in order to obtain high reliability and durability under various circumstances. In order to enhance this adhesion, a polarizing film is used in which the surface of a cellulose triacetate film widely used for a protective layer is saponified with an alkaline solution and the cellulose triacetate film is provided on the polarizing surface through a polyvinyl alcohol type adhesive. However, since this method comprises employing a concentrated alkaline solution for the saponification, it is not favorable in view of manufacturing safety and environmental protection. Further, the alkaline processing causes bleed-out of the plasticizer or haze increase, resulting in poor quality.

An anti-static or hard coating treatment of the cellulose triacetate film is carried out before alkaline processing, but the successive alkaline processing reduces the effects of the treatment. Therefore, there is a problem in that various treatments of the cellulose triacetate protective film must be carried out after the alkaline processing.

SUMMARY OF THE INVENTION

1) A first object of the invention is to provide a protective film for a polarizing plate which is excellent in scratch and chemical resistance.

2) A second object of the invention is to provide a protective film for a polarizing plate which has an excellent adhesion of the protective film to the polarizing film.

3) A third object of the invention is to provide a protective film for a polarizing plate which has excellent flexibility.

4) A fourth object of the invention is to provide a protective film for a polarizing plate which has excellent glare resistance.

5) A fifth object of the invention is to provide a protective film for a polarizing plate which has excellent adhesion to the polarizing film and shows no ultra violet light absorption ability deterioration and no discoloration during long term storage under high temperature and humidity 6) A sixth object of the invention is to provide a cellulose ester film with reduced cost which is manufactured by a process eliminating a saponification process.

Another object of the invention will be apparent from the description below.

DETAILED DESCRIPTION OF THE INVENTION

The above object of the invention could be attained by the following constitution:

(1) A protective film for a polarizing plate comprising a transparent resin film, and provided on at least one side of the resin film, a hardened layer composed of a composition comprising an ultraviolet ray hardenable polyol acrylate resin, (2) The protective film for a polarizing plate of (1) above, wherein the ultraviolet ray hardenable polyol acrylate resin is dipentaerythritol hexaacrylate, (3) The protective film for a polarizing plate of (1) or (2) above, wherein an adhesive layer comprising hydrophilic polymer is provided on the side of the transparent film opposite the hardened layer.

(4) The protective film for a polarizing plate of (1), (2) or (3) above, wherein the hardened layer contains an inorganic or organic fine particles, (5) The protective film for a polarizing plate of (1), (2), (3) or (4) above, wherein the composition comprising an ultraviolet ray hardenable polyol acrylate resin further contains a UV absorbent or an antioxidant.

The term "transparent" herein referred to means that transmittance is 80% or more when measured with a spectro photometer.

Figure 1:
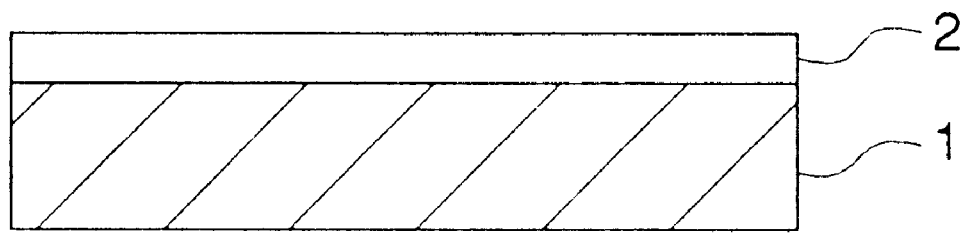
FIG. 1a and FIG. 1b show a layer structure of the protective film of the invention for a polarizing plate.
Figure 1:
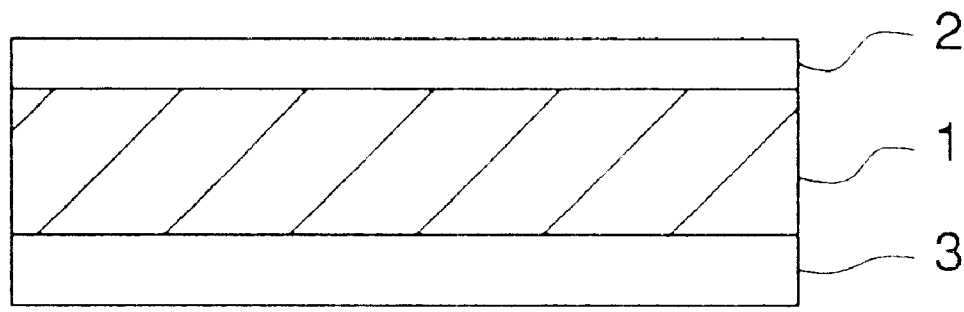

The layer structure of the protective film of the invention for a polarizing plate is shown in FIG. 1.

In FIG. 1, the structure of FIG. 1(a), showing a hardened layer 2 on a transparent resin film 1, is preferable. FIG. 1(b) shows an adhesive layer 3 on the side of the transparent resin film opposite the hardened layer 2. The protective film adheres to a polarizing film through the adhesive layer.

The transparent resin film used in the invention is not specifically limited, and is selected from a conventional transparent resin film. The material for the transparent resin film includes polyester such as polyethylene terephthalate or polyethylene naphthalate, polyethylene, polypropylene, cellophane, diacetylcellulose, triacetylcellulose, acetylcellulose butylate, polyvinyl chloride, polyvinylidene chloride, polyvinyl alcohol, ethylene-vinyl alcohol, polystyrene, syndiotactic polystyrene, norbornene, polycarbonate, polyarylate, polymethyl methacrylate, polyacrylate, polymethylpentene, polysulfone, polyetherketone, polyethersulfone, polyetherimide, polyimide, fluorine-containing resin, nylon, and acryl. In the invention, polyethylene terephthalate, polyethylene naphthalate, triacetylcellulose (cellulose triacetate), polyarylate, polymethyl methacrylate or a polycarbonate film is preferably used in view of high transparency and no optical anisotropy.

The cellulose triacetate film usually contains a plasticizer such as triphenyl phosphate, biphenyldiphenyl phosphate, dimethylethyl phosphate or ethylphthalylethyl phosphate. The thickness of the resin film is different depending on kinds of polymer, but is 20 $\mu$m to 1 mm. The thickness is optionally selected by the usage, and is usually 30 to 150 $\mu$m. The protective film optionally contains a UV absorbent, a plasticizer, a lubricant or a matting agent.

The polyol acrylate resin is an ester compound of a polyhydric alcohol with an ethylenically unsaturated acid. The acid is preferably acrylic acid, methacrylic acid and itaconic acid. The polyol acrylate resin is preferably an active energy ray hardenable polyol acrylate resin. The active energy ray includes an electron beam and an ultraviolet ray, and preferably is an ultraviolet ray.

The ultraviolet ray hardenable polyol acrylate resin used in the invention includes a photo-polymerizable monomer oligomer such as trimethylolpropane triacrylate, ditrimethylolpropane tetraacrylate, pentaerythritol tetraacrylate, dipentaerythritol pentaacrylate, dipentaerythritol hexaacrylate or alkyl-modified dipentaerythritol pentaerythritol. This polyol acrylate resin is highly crosslinkable and hardenabe, and provides high hardness and small shrinkage on hardening, having no order, no harm and high safety.

The ultraviolet ray hardenable polyol acrylate resin may contain another ultraviolet ray hardenable resin such as an ultraviolet ray hardenable epoxy resin, as long as the invention is not adversely effected. The hardened layer preferably contain fine particles in view of prevention of blocking and glare resistance.

The inorganic fine particles used in the invention includes silicon oxide, titanium oxide, aluminum oxide, zinc oxide, tin oxide, calcium carbonate, barium sulfate, talc, kaolin and calcium sulfate.

The organic fine particles used in the invention includes polymethylmethacrylate resin powder, silicon resin powder, polystyrene resin powder, polycarbonate resin powder, acrylstyrene resin powder, benzoguanamine resin powder, melamine resin powder, polyolefin resin powder, polyester resin powder, polyamide resin powder, polyimide resin powder and polyethylene fluoride resin powder.

These fine particles have an average volume diameter of 0.01 to 10 $\mu$m. The content of the fine particles is preferably 0.1 to 20 parts by weight based on the 100 parts by weight of the resin composition. In order to provide glare resistance, the content of the fine particles having an average volume diameter of 1 to 10 $\mu$m is preferably 1 to 15 parts by weight based on the 100 parts by weight of the resin composition. In order to provide blocking prevention, the content of the fine particles having an average volume diameter of 0.01 to 5 $\mu$m is preferably 0.1 to 5 parts by weight based on the 100 parts by weight of the resin composition.

The ultraviolet ray hardenable resin composition containing the above ultraviolet ray hardenable resin usually contains photo-polymerization initiators such as acetophenones, benzophenones, Michler's benzoylbenzoate, α-amyloxime esters, tetramethylthiuram sulfide and thioxanthones or photo-sensitizers such as n-butylamine, triethylamine and tri-n-butylphosphine.

The ultraviolet ray hardenable resin composition used in the invention contains a photo-polymerization initiator in an amount of preferably 0.1 to 15 parts by weight, more preferably 1 to 10 parts by weight based on the 100 parts by weight of an ultraviolet ray hardenable prepolymer.

The ultraviolet ray hardenable resin composition used in the invention may contain colorants such as pigment and dyes, additives such as anti-foaming agents, viscosity increasing agents, leveling agents, non-flammable agents, UV absorbents, antioxidants and fillers or resin improving agents, in addition to the polyol acrylate resin, as long as the invention is not adversely effected.

When the ultraviolet ray hardenable resin composition used in the invention is irradiated by ultraviolet rays, the light source emitting light (hereinafter referred to also as ultraviolet rays) of ultraviolet wavelength includes a sun light, a low pressure mercury vapor lamp, a high pressure mercury vapor lamp, a super high pressure mercury vapor lamp, a carbon arc lamp, ma metal halide lamp and a xenon lamp.

The ultraviolet ray irradiation can be carried out under an air, nitrogen or inert gas atmosphere.

In the invention, the composition containing the ultraviolet ray hardenable resin or a solution containing the composition is coated through a gravure coater, a spinner coater, a wire bar coater, an extrusion coater or a reverse-roll coater, and then dried and hardened by ultraviolet irradiation to obtain a dry coating thickness of preferably 0.1 to 30 $\mu$m, more preferably 0.5 to 15 $\mu$m. The solution is obtained by dissolving the composition in an organic solvent to give a concentration of 10 to 95 weight %.

In the invention, the composition containing the ultraviolet ray hardenable resin is irradiated with ultraviolet rays for preferably 0.5 seconds to 5 minutes, more preferably 3 seconds to 3 minutes, in which the irradiation time is varied depending on the kinds of ultraviolet light source.

Generally, the shortage of the irradiation time requires a large-scale light source having a high irradiation intensity. When the irradiation time is long, a light source having a low irradiation intensity can be used, but the hardening time is long, resulting in disadvantages in manufacturing. According to the invention, the object of the invention is attained by 3 second to 2 minute exposure employing not more than 200 W UV ray radiation lamp.

The UV absorbent used in the invention includes a salicylic acid derivative (UV-1), a benzophenone derivative (UV-2), a benzotriazole derivative (UV-3), an acrylonitrile derivative (UV-4), a benzoic acid derivative (UV-5) and an organic metal complex derivative (UV-5). The salicylic acid derivative (UV-1) includes phenyl salicylate, 4-tert-butylphenyl salicylate, and p-octylphenyl salicylate. The benzophenone derivative (UV-2) includes 2,4-dihydroxy benzophenone, 2-hydroxy-4-methoxybenzophenone, 2,2'-dihydroxy-4-methoxy-benzophenone, 2-hydroxy-4-methoxy-2'-carboxy-benzophenone, 2-hydroxy-4-methoxy-5-sulfobenzophenone trihydrate, 2-hydroxy-4-octoxybenzophenone, 2-hydroxy-4-octoxybenzylbenzophenone, 2-hydroxy-4-stearyloxybenzophenone and 2,2'dihydroxy-4,4',-dimethoxybenzophenone. The benzotriazole derivative (UV-3) includes 2-(2'hydroxy-5'-methylphenyl) benzotriazole, 2-(2'-hydroxy-3',5'-di-tert-butylphenyl)-5-chlorobenzotriazole, 2-(2'-hydroxy-5-tert-butylphenyl) benzotriazole, 2-(2'-hydroxy-3',5'-di-tert-butylphenyl) benzotriazole, 2-(3,5-di-tert-amyl-hydroxyphenyl) benzotriazole, 2-(2'-hydroxy-3'-tert-butyl-5'-methylphenyl) benzotriazole, 2-(2'-hydroxy-3',5'diisoamyl phenyl) benzotriazole, and 2-(2'-hydroxy-4'-octoxyphenyl) benzotriazole. The acrylonitrile derivative (UV4) includes 2-ethylhexyl-2-cyano-3,3'-diphenylacrylate, ethyl-2-cyano-3,3'-diphenylacrylate and methyl-α-cyano-β-methyl-β-(p-methoxyphenyl)acrylate. The benzoic acid derivative (UV-5) includes resorcinol monobenzoate and 2',4'di-tert-butylphenyl-3,5-di-tert-butyl-4-hydroxybenzoate. The organic metal complex derivative (UV-6) includes nickel bis-octylphenyl sulfamide and [2,2'-thiobis(4-tert-octylphenolate)]-n-butylamine nickel, and ethyl-3,5-di-tert-butyl-4-hydroxybenzyl phosphoric acid nickel complex.

The UV absorbent can be used in an admixture of two or more kinds. The UV absorbent content of the UV ray hardenable composition in the invention is preferably 0.1 to 15 weight %, and more preferably 0.5 to 8 weight %.

The antioxidant used in the invention includes a hindered phenol derivative (AO-1), a thiobipropionic acid derivative (AO-2) and a phosphite derivative (AO-3). The hindered phenol derivative (AO-1) includes 4,4'thiobis(6-tert-butyl-3-methylphenol), 4,4'-butylidenebis(6-tert-butyl-3-methylphenol), 4,4'-butylidenebis(3-methyl-6-tert-butylphenol), 2,2'-thiobis(6-tert-butyl-4-methylphenol), 2,6-di-tert-butylphenol, 4,4'-methylenbis(6-tert-butylphenol), 4,4'-bis(2,6-di-tert-butylphenol), 4,4'-methylenebis(6-tert-butyl-o-cresol), 4,4'-thiobis(6-tert-butyl-o-cresol), 1,1,3-tris(5-tert-butyl-4-hydroxy-2-methylphenyl)butane, 2,4,6-tris(3,5-ditert-butyl-4-hydroxybenzyl)mesitylene, 1,3,5-tris(3,5-di-tert-butyl-4-hydroxybenzyl)isocyanurate, 1,3-bis(3,5-di-tert-butyl-4-hydroxyphenyl)-2,2'-bis(2-dodecylthiomethoxycarbonyl)propane, 1,6-bis(3,5-di-tert-butyl-4-hydroxyphenylacetoxy)hexane, 6-(4-hydroxy-3,5-di-tert-butylanilino)-2,4-bis(n-octylthio)-1,3,5-triazine, tetrakis[β-(3,5-di-tert-butyl-4-hydroxyphenyl) propionyloxymethyl]methane, n-octadecyl-3-(4'-hydroxy-3',5'-di-tert-butylphenyl)propionate, dioctadecyl-4-hydroxy-3,5-di-tert-butylbenzylphosphonate and diethyl-4-hydroxy-3,5-di-tert-butylbenzylphosphonate. The thiobipropionic acid derivative (AO-2) includes dilauryl-3,3'-thio-di-propionate and di-stearylthio-di-propionate. The phosphite derivative (AO-3) includes triphenylphosphite, trisnonylphenylphosphite, diphenyldecyl phosphite and dicresyl phosphite.

The antioxidant can be used in an admixture of two or more kinds. The antioxidant content of the UV ray harden-able composition in the invention is preferably 0.1 to 15 weight %, and more preferably 0.2 to 6 weight %.

When the UV ray hardenable composition in the invention contains the UV absorbent or antioxidant, the composition may contain one of the UV absorbent and antioxidant. The UV absorbent or antioxidant may be added to the composition directly or in a form of solution in which the UV absorbent or antioxidant is dissolved in a solvent such as acetone, methanol, ethyl acetate or toluene.

In the protective film in the invention for a polarizing plate, an adhesion layer, to which a polarizing film is adhered, is preferably provided on the side of a transparent resin film opposite the UV ray hardened layer of the protective film.

The adhesion layer may be single or two layered. The hydrophilic polymer in the invention includes a polymer containing —COOH, preferably a —COOH containing vinyl acetate-maleic acid copolymer, a hydrophilic cellulose derivative, a polyvinyl alcohol derivative, a natural polymer, a hydrophilic polyester derivative, and a polyvinyl derivative. The preferable embodiment includes those in which a layer containing a —COOH containing vinyl acetate-maleic acid copolymer is provided or a layer containing the above hydrophilic cellulose derivative, polyvinyl alcohol derivative, natural polymer, hydrophilic polyester derivative, or polyvinyl derivative is provided adjacent to the layer containing the copolymer on the polarizing film side.

The copolymer containing a specific —COOM group used in the invention is represented by the following Formula (1) or (2):

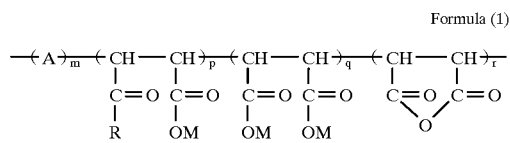

Formula (1)

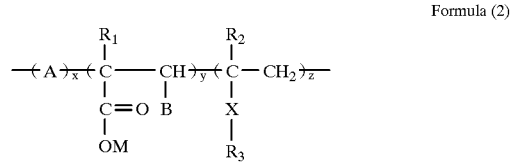

Formula (2)

In Formula above, A represents a vinyl monomer; B represents a hydrogen atom, —CO—OM, in which M represents a hydrogen atom or a cation, or —(CO)—R, in which R represents —OR' or —N(R')(R") in which R' represents an alkyl group, an aralkyl group, an aryl group, a heterocyclic residue or a non-metallic atomic group necessary to form a heterocyclic ring together with R", and R" represents a hydrogen atom, an alkyl group having not more than 8 carbon atoms or a non-metallic atomic group necessary to form a heterocyclic ring together with R', provided that when z=0, B is a hydrogen atom; $R_1$ and $R_2$ independently represent a hydrogen atom or an alkyl group having not more than 8 carbon atoms; X represents —(CO)—O— or —O—(CO)—; $R_3$ represents a halogenated alkyl group or a halogenated alkyloxyalkyl group; and m, p, q, r, x, y and z independently represent mol %, in which m is 0 to 60, p is 0 to 100, q is 0 to 100, r is 0 to 100, x is 0 to 60, y is 0 to 100, z is 0 to 100, and m+p+q+r+x+y+z=100.

In above Formula, the vinyl monomer includes styrene, styrene having nitro, fluorine, chlorine, bromine chloromethyl or lower alkyl, vinylmethyl ether, vinylethyl ether, vinylchloroethyl ether, vinyl acetate, vinyl chloroacetate, vinyl propionate, an unsaturated acid such as acrylic acid, methacrylic acid or itaconic acid, an alkyl acrylate or methacrylate in which the alkyl represents an unsubstituted alkyl group of 1 to 5 carbon atoms or an alkyl group having a chlorine atom or a phenyl group, a phenyl acrylate or methacrylate in which the phenyl represents an unsubstituted phenyl group or a phenyl group having a chlorine atom or a phenyl group, acrylonitrile, vinyl chloride, vinylidene chloride, ethylene, acrylamide, an acrylamide having an alkyl group of 1 to 5 carbon atoms, a chlorine atom or a phenyl group, vinyl alcohol, glycidyl acrylate and acrolein. The preferable are styrene, styrene having a substituent, vinyl acetate, vinylmethyl ether, an alkyl acrylate or acrylonitrile.

In above Formula, the alkyl group represented by R' includes an alkyl group having preferably 1 to 24 carbon atoms, and may be straight-chained, branched or cyclic. The alkyl group may have a substituent such as a hydroxy group, a hydroxy carbonyl group, —COOM' in which M' represents a cation, and preferably a halogenated (particularly fluorinated) alkyl group or halogenated (particularly fluorinated) alkyloxyalkyl group. The number of the halogen atom in the halogenated alkyl group or halogenated alkyloxyalkyl group is 1 to 37. This halogenated alkyl group or halogenated alkyloxyalkyl group, and the halogenated alkyl group or halogenated alkyloxyalkyl group represented by $R_3$ in Formula (2) is preferably represented by the following Formula (3):

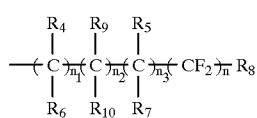

Formula (3)

In Formula (3), $R_4$, $R_5$, $R_6$, $R_7$ and $R_8$ independently represent a hydrogen atom or a fluorine atom; n represents an integer of 1 to 12; $n_2$ represents 0 or 1, provided that when $n_2$ is 0, $n_1$ represents 0 and when $n_2$ is 1, $n_1$ represents 2 or 3; $n_3$ represents an integer of 1 or 17; and $n_1+n_2=1$ to 17. When the number of $R_4$ is 2 or more, the plural $R_4$'s may be different as one of $R_4$'s is hydrogen while others are fluorine. Similarly, plural $R_5$'s, $R_6$'s and $R_7$'s may be different, rsspectively.

In Formula (1), when R' represents the halogenated alkyl group or halogenated alkyloxyalkyl group as described above, R preferably represents —O—R'. The R' may have a substituent such as a fluorine-, chlorine- or bromine-containing lower alkyl group, a hydroxyl group, a hydroxycarbonyl group, an oxycarbonyl group, a nitrile group or a nitro group.

The heterocyclic ring represented by R' or the heterocyclic ring represented by R' and R" a saturated or unsaturated heterocyclic ring containing an oxygen or sulfur atom. The example includes a heterocyclic ring selected from aziridine, pyrrole, pyrrolidine, pyrazole, imidazole, imidazoline, triazole, piperidine, piperazine, oxazine, morpholine, and thiazine. The cation represented by M includes an ammonium, sodium, potassium or lithium ion.

The polymer containing a —COOM group represented by Formula (1) or (2) can be used singly or in admixture of two or more kinds. The average (weight average) molecular weight of the polymer is preferably 500 to 500,000.

The typical examples of the polymer will be shown below, but is not limited thereto.

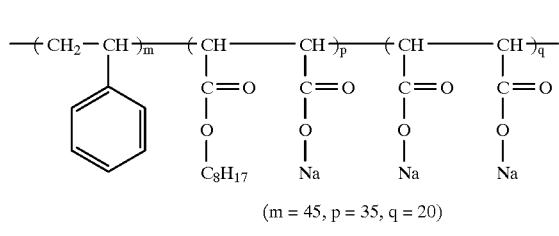

(m = 45, p = 35, q = 20)

(1)

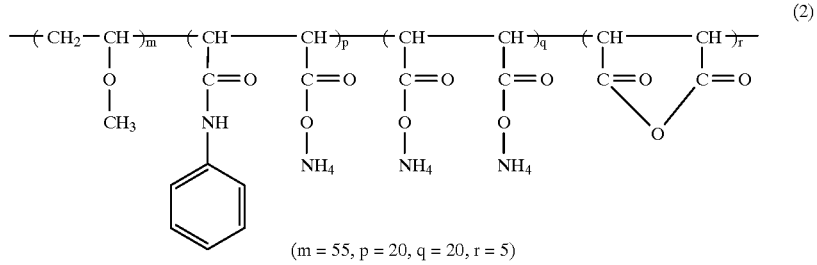

(m = 55, p = 20, q = 20, r = 5)

(2)

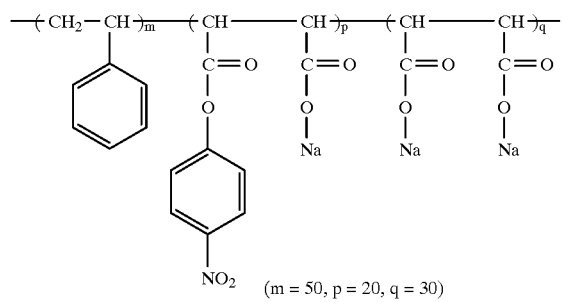
(3)
(m = 50, p = 20, q = 30)
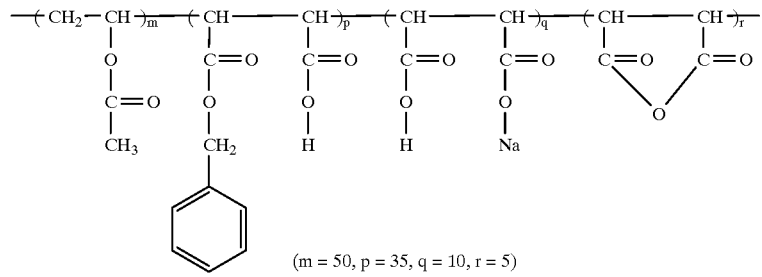
(4)
(m = 50, p = 35, q = 10, r = 5)
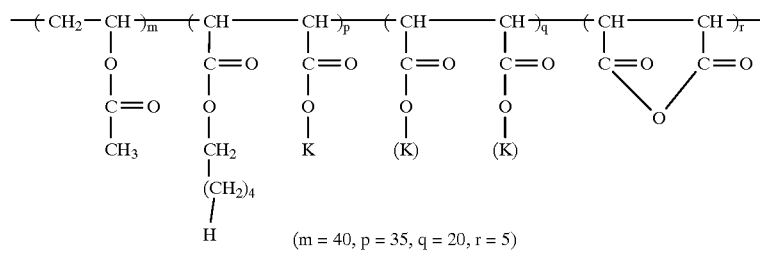
(5)
(m = 40, p = 35, q = 20, r = 5)
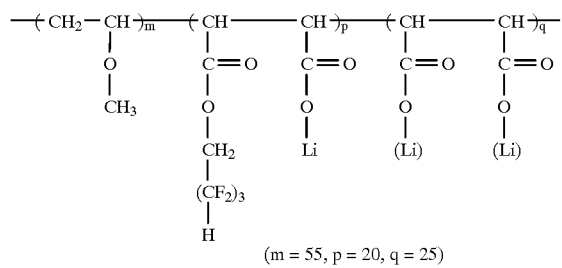
(6)
(m = 55, p = 20, q = 25)
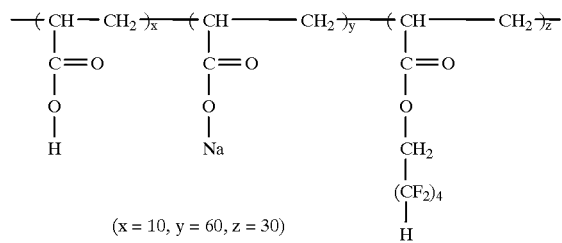
(7)
(x = 10, y = 60, z = 30)

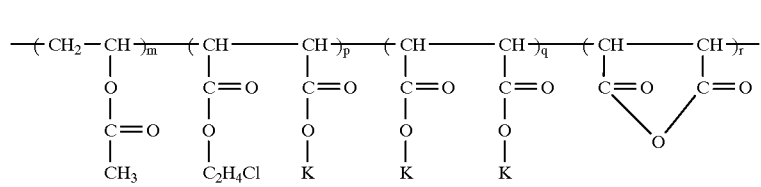
(8)
(m = 40, p = 8, q = 47, r = 5)
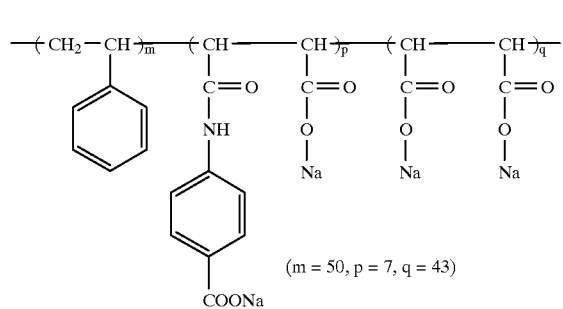
(9)
(m = 50, p = 7, q = 43)
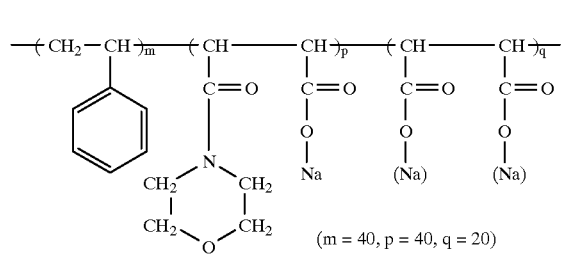
(10)
(m = 40, p = 40, q = 20)
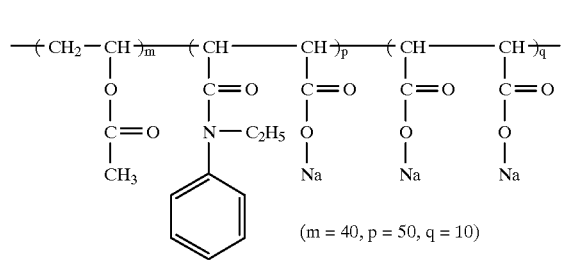
(11)
(m = 40, p = 50, q = 10)
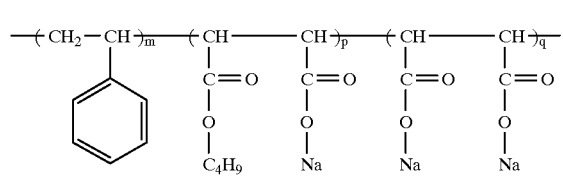
(12)
(m = 50, p = 2, q = 48)
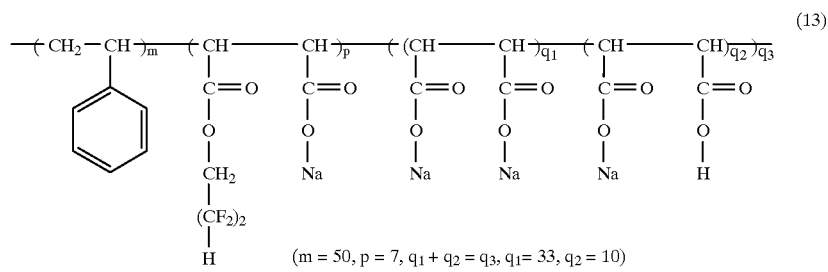
(13)
(m = 50, p = 7, $q_1 + q_2 = q_3$, $q_1 = 33$, $q_2 = 10$)

(14)
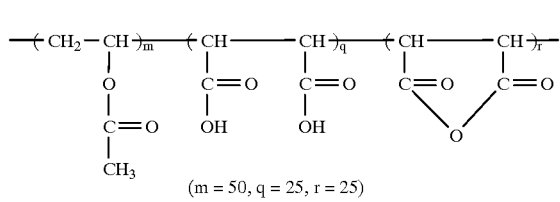
(m = 50, q = 25, r = 25)
(15)
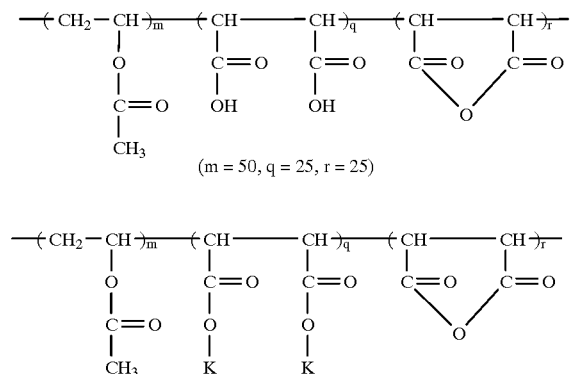
(m = 40, q = 58, r = 2)
(16)
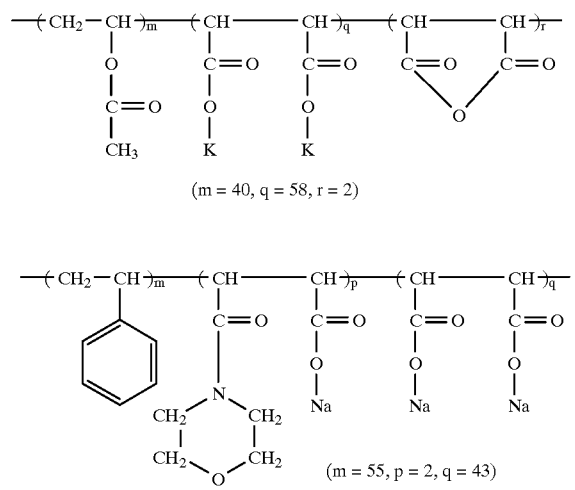
(m = 55, p = 2, q = 43)
(17)
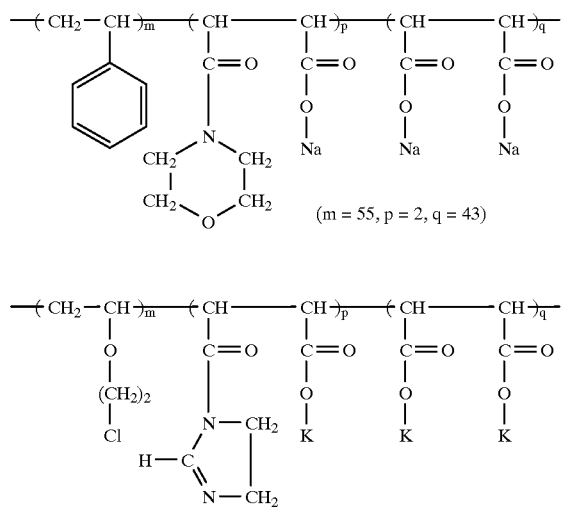
(m = 30, p = 37, q = 33)
(18)
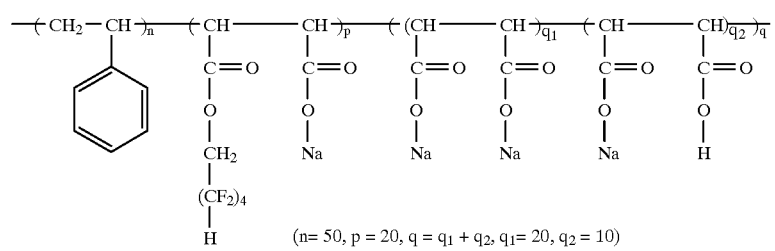
(n = 50, p = 20, q = $q_1 + q_2$, $q_1$ = 20, $q_2$ = 10)
(19)
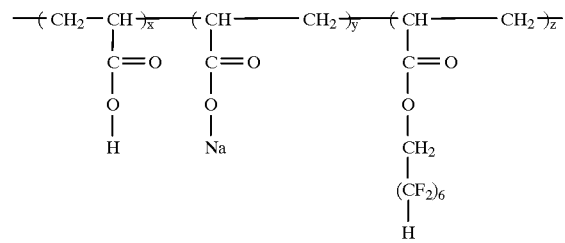
(x = 10, y = 60, z = 30)

The polymer containing a —COOM group represented by Formula (1) or (2) can be synthesized by a conventional method. The maleic anhydride copolymer is a well known polymeric compound, and its derivative can be easily prepared by reaction with alcohols or amines, and can be also prepared by copolymerizing a purified maleic anhydride derivative, which is obtained by reacting maleic anhydride with alcohols or amines, with another vinyl monomer. The acrylates having a halogenated alkyl group or a halogenated alkyloxyalkyl group can be easily synthesized by a synthetic method of a monomer and polymer disclosed in Journal of Polymer Science, 15, 515–574 (1955) or British Patent No. 1,121,357.

The content of the polymer represented by Formula (1) or (2) is preferably 10 to 1000 mg/m$^2$, and more preferably 20 to 300 mg/m$^2$.

Another hydrophilic polymer used in the invention includes hydrophilic cellulose derivatives such as methylcellulose, carboxymethylcellulose and hydroxycellulose, polyvinyl alcohol derivatives such as polyvinyl alcohol, vinyl acetate-vinyl alcohol copolymer, polyvinyl acetal, polyvinyl formal and polyvinyl benzal, natural polymeric compounds such as gelatin, casein, and gum arabic, hydrophilic polyester derivatives such as partially sulfonated polyethylene terephthalate, polyvinyl derivatives such as poly-N-vinyl pyrrolidone, polyacryl amide, polyvinyl indazole and polyvinyl pyrazole.

The hydrophilic polymer used in the invention can be used singly or in admixture of two or more kinds.

The hydrophilic polymer solution used in the invention can be coated by a conventional method employing a gravure coater, a dip coater, a reverse roll coater and an extrusion coater. The content of the hydrophilic polymer is 10 to 1000 mg/m$^2$, and preferably 20 to 300 mg/m$^2$, in view of stable adhesion and quality after coating. The drying method of the coating is not specifically limited, but the coating is preferably dried to have a residual solvent content of 5% or less. When the residual solvent is too much, bubbles are likely to produce between the polarizing surface and the protective film.

The hydrophilic polymer solution used in the invention optionally contains an ultraviolet absorbent, a lubricant, a matting agent, an antistatic agent, a cross-linking agent or a surfactant.

The addition of the cross-linking agent is preferable in view of enhancing adhesion between the polarizing film and the polyvinyl alcohol film. The cross-linking agent includes an epoxy compound, an aziridine compound, an isocyanate compound, alum and a boron-containing compound.

The adhesive used to adhere the surface of the protective film to a polarizing film in the invention includes a polyvinyl alcohol adhesive such as polyvinyl alcohol adhesive or polyvinyl butyral, and a vinyl latex adhesive such as butyl acrylate.

EXAMPLE

The invention will be detailed according to the following examples, but is not limited thereto. In the examples, "part" represents part by weight, and the content of each component in the coating composition is represented by weight ratio.

Example 1

The following coating composition containing the UV ray hardenable resin composition as shown in Table 1 was coated on one side of a 80 μm thick cellulose triacetate film (Konitac 80UV-2 produced by Konica Corp., hereinafter referred to as TAC) to be 10 μm thick, and dried at 80° C. for 5 minutes. The coated layer was exposed for 4 seconds to light of a 60 W/cm high pressure mercury vapor lamp 10 cm distant from the layer to obtain a hardened layer. Thus, sample 1 was obtained. Thereafter, 20 ml of each of the following lower layer solution (1) and upper layer solution (2), which were adhesion layer coating solutions containing a hydrophilic compound, were coated in that order on the side of the TAC opposite the hardened layer of sample 1, and dried for 10 minutes at 100° C. Thus, inventive samples 2 and 3 were obtained.

(Coating compositions)

<Ultraviolet ray hardenable resin composition (A)>

| | |
|---|---|
| Dipentaerithritol hexaacrylate monomer | 60 parts |
| Dimer of dipentaerithritol hexaacrylate | 20 parts |
| Trimer or more polymeric compound of dipentaerithritol hexaacrylate trimer | 20 parts |
| Diethoxybenzophenone UV initiator | 2 parts |
| Silicone type surfactant (Trade name: KP323 produced by Shinetsu Silicone Co. Ltd.) | 1 part |

<Silica fine particles (A)>

Aerosil R-972 (Average particle diameter 16 nm, produced by Nihon Aerosil Co., Ltd.)

<Solvent>

Methylethyl ketone:ethyl acetate:isopropyl alcohol = 1:1:1 (weight ratio)

(Adhesion layer coating solution)

Lower layer solution (1)

| | |
|---|---|
| Exemplified Compound (14) | 0.5 g |
| Acetone | 60 ml |
| Ethyl acetate | 30 ml |
| Toluene | 10 ml |

Upper layer solution (1)

| | |
|---|---|
| Polyvinyl alcohol (Gosenol NH-26, produced by Nihon Gosei Kagakukogyo Co., Ltd.) | 0.5 g |
| Saponin (surfactant produced by Merc Co., Ltd.) | 0.03 g |
| Pure water | 50 ml |
| Methanol | 50 ml |

Example 2

The both surfaces of a 80 μm thick polycarbonate film (produced by Teijin Co., Ltd., hereinafter referred to as PC) were corona discharged at 20 W/m$^2$/min. The following coating composition containing the UV ray hardenable resin composition as shown in Table 1 was ultrasonic wave dispersed, and coated on one side of the corona charged PC to be 10 μm thick and dried at 80° C. for 5 minutes. The coated layer was exposed for 4 seconds to light of a 60 W/cm high pressure mercury vapor lamp 10 cm distant from the layer to obtain a ha rdened layer. Thus, sample 4 was obtained . Thereafter, adhesion layer coating solutions were coated on the side of the PC opposite the hardened layer of sample 4 and dried in the same manner as in Example 1. Thus, inventive samples 5 and 6 were obtained.

<Ultraviolet ray hardenable resin composition (B)>

| | |
|---|---|
| hexaacrylate monomer | 50 parts |
| Dimer of hexaacrylate | 20 parts |

-continued

| <Ultraviolet ray hardenable resin composition (B)> | |
|---|---|
| Trimer or more polymeric compound of hexaacrylate trimer | 20 parts |
| 1,4-Butanediol diglycidyl ether | 10 parts |
| Diethoxybenzophenone UV initiator | 2 parts |
| Aromatic sulfonium salt UV initiator | 0.5 parts |
| Fluorine-containing surfactant (Trade name: MEGAFAC F177 produced by Dainihon Ink Co. Ltd.) | 1 part |
| Methylethylketone:ethylacetate:isopropyl alcohol (1:1:1) | |

Comparative Example 1

A 80 μm thick TAC was immersed in a 8 weight % aqueous sodium hydroxide solution at 60° C. and washed with water to obtain a saponified TAC. Thus, sample 7 was obtained.

Comparative Example 2

A 80 μm thick PC was treated in the same manner as in Comparative example 1 to obtain a saponified PC. Thus, sample 8 was obtained.

Example 3

The coating composition containing the UV ray hardenable resin composition as shown in Table 2 was ultrasonic wave dispersed, and coated on one side of a 80 μm thick TAC to be 10 μm thick and dried at 80° C. for 5 minutes. The coated layer was exposed for 4 seconds to light of a 60 W/cm high pressure mercury vapor lamp 10 cm distant from the layer to obtain a hardened layer. Thereafter, the adhesion layer coating solutions were coated on the side of the TAC opposite the hardened layer and dried in the same manner as in Example 1, except that the following lower layer solution (2) was used instead of the lower layer solution (1). Thus, inventive samples 9 through 14 were obtained.

| <Silica fine particles (B)> | |
|---|---|
| CIRISIA 431 (Average particle diameter 2.5 μm, produced by Fuji sirisia Chemical Co., Ltd.) | |
| <Silicone resin fine particles (C)> | |
| TOSPAR 130 (Average particle diameter 3 μm, produced by Toshiba Silicone Chemical Co., Ltd.) | |
| Methylethylketone:ethylacetate:isopropyl alcohol (1:1:1) | |
| (Adhesion layer coating solution) | |
| Lower layer solution (2) | |
| Exemplified Compound (15) | 0.5 g |
| Acetone | 60 ml |
| Ethyl acetate | 30 ml |
| Dimethylformamide | 10 ml |

Comparative Example 3

The protective film sample was prepared in the same manner as in Example 1, except that the coating composition (as also shown below) containing the UV ray hardenable resin composition as shown in Table 2 was used instead of the coating composition of Example 1. The resulting film sample was further saponified in the same manner as in Comparative Example 1. Thus, sample 15 were obtained.

| <Ultraviolet ray hardenable resin composition (C)> | |
|---|---|
| Polyester acrylate resin SOMACOAT TP-232 (produced by Somar Kogyo Co., Ltd.) | 100 parts |
| Polyisocyanate compound COLONATE L (produced by Nihon Polyurethane Co., Ltd.) | 1 part |
| UV initiator, IRGACURE 184 (produced by Ciba Geigy Co., Ltd.) | 5 parts |

Example 4

The both surfaces of a 75 μm thick film (trade name: ENBRADE produced by Unichika Co., Ltd., hereinafter referred to as PAR) were corona discharged at 20 W/m²/min. The coating composition containing the UV ray hardenable resin as shown in Table 1 was coated on one side of the corona charged PAR to obtain a hardened layer in tha similar manner as in Example 1. Thus, sample 16 was obtained. Thereafter, adhesion layer coating solution was coated on the side of the PAR opposite the hardened layer and dried in the same manner as in Example 1. Thus, inventive sample 17 was obtained.

Example 5

The both surfaces of a 75 μm thick polyethylene terephthalate film (trade name: DIAFOIL produced by Diafoil Hoechst Co., Ltd., hereinafter referred to as PET) were corona discharged at 20 W/m²/min. The coating composition containing the UV ray hardenable resin as shown in Table 1 was coated on one side of the corona charged PET to obtain a hardened layer in tha similar manner as in Example 2. Thus, sample 18 was obtained. Thereafter, adhesion coating layer solution was coated on the side of the PET opposite the hardened layer and dried in the same manner as in Example 1, except that the following lower layer solution (3) was used instead of lower layer solution (1). Thus, inventive sample 19 was obtained.

| (Adhesion layer coating solution) | |
|---|---|
| Lower layer solution (3) | |
| Exemplified Compound (4) | 1.0 g |
| Saturated polyester resin (Trade name: BILON $T_g$ = 67° C. produced by Toyobo Co., Ltd.) | 0.5 g |
| Acetone | 40 ml |
| Ethyl acetate | 50 ml |
| N,N-dimethylformamide | 10 ml |

Example 6

Syndiotactic polystyrene (SPS) pellets were prepared according to a method disclosed in Japanese Patent O.P.I. Publication No. 3-131843/1995. The SPS pellets were melted at 330° C. and extruded by an extruder. The melted polymer was extruded through a pipe on a cooled casting drum from a die-slit while applying electrostatic potential and cooled, to obtain a 1000 μm thick unoriented sheet. Said sheet was, after being pre-heated at 115° C., stretched in the longitudinal direction with stretching magnification degree at 3.3 times and, after pre-heated at 100° C. in a tenter, further stretched in the lateral direction with the stretching magnification degree at 3 times. Then, the resulting sheet, while relaxed laterally, was heat set at 225° C. to obtain a 100 μm thickness SPS film.

Next, the both surfaces of the SPS film were corona discharged at 20 W/m²/min. The coating composition containing the UV ray hardenable resin as shown in Table 1 was coated on one side of the corona charged SPS film to obtain a hardened layer in tha similar manner as in Example 2. Thus, sample 20 was obtained. Thereafter, adhesion layer coating solution was coated on the side of the SPS film opposite the hardened layer and dried in the same manner as in Example 1, except that the following lower layer solution (4) was used instead of lower layer solution (1). Thus, inventive sample 21 was obtained.

(Adhesion layer coating solution)

Lower layer solution (4)

| | |
|---|---|
| Exemplified Compound (44) | 0.7 g |
| Polystyrene resin | 0.3 g |
| (Trade name: TOBOLEX XGPPS550-51 produced by Mitsui Toatus Chemical Co., Ltd.) | |
| Acetone | 40 ml |
| Ethyl acetate | 50 ml |
| Toluene | 10 ml |

Example 7

<Preparation of a Norbornene Type Polyolefin Resin Film>

In a 1000 ml reaction vessel charged with nitrogen 1.5 g of $Pd(CH_3CN)_4(BF_4)_2$ was dissolved in a 100 ml nitromethane. The solution, in which 150 g of 8-carboxyltetracyclo-[$4.4.0.1^{2.5}.1^{7.10}$]-3-dodecene was dissolved in a 150 ml nitromethane was added thereto at room temperature while stirring and reacted for one hour. Methanol of 500 ml was added to the reaction mixture and filtered to obtain precipitate. The resulting precipitate was washed with a mixture solution of 300 ml of methanol and 40 ml of concentrated hydrochloric acid, further washed with methanol, and dried at 60° C. at vacuum pressure to obtain a norbornene type resin.

The following dope composition was prepared.

| <Dope composition > | |
|---|---|
| Norbornene type resin | 1000 parts by weight |
| 2-(2'-hydroxy-3,5'-di-t-butylphenyl)benzotriazole | 1.0 parts by weight |
| Methylene chloride | 430 parts by weight |
| Methanol | 90 parts by weight |

The above composition was incorporated and tightly closed in a vessel and stirred at 80° C. while pressure was applied to obtain a solution. The resulting solution was filtered, cooled, spread at 33° C. on a stainless steel band, dried at 33° C. for 5 minutes, and further dried at 65° C. to give a retardation of 5 nm. The resulting film was separated from the stainless steel band, and dried while transporting on many rollers to a 80 μm thick norbornene type resin (hereinafter referred to as NRB) film.

The coating composition containing the UV ray hardenable resin composition was coated on one side of the above obtained NRB film in the same manner as in Example 2 to obtain a hardened layer. Thus, sample 25 was obtained. Thereafter, adhesion layer coating solution was coated on the side of the film opposite the hardened layer and dried in the same manner as in Example 2. Thus, inventive sample 26 was obtained.

Comparative Example 4

A 75 μm thick PAR film was saponified in the same manner as in Comparative example 1 to obtain sample 22.

Comparative Example 5

A 75 μm thick PET film was saponified in the same manner as in Comparative example 1 to obtain sample 23.

Comparative Example 6

The 100 μm thick SPS film prepared in Example 6 was saponified in the same manner as in Comparative example 1 to obtain sample 24.

Comparative Example 7

The NRB film prepared in Example 7 was saponified in the same manner as in Comparative example 1 to obtain sample 27.

Comparative Example 8

The following coating composition (D) containing the UV ray hardenable resin composition as shown in Table 1 was coated on one side of a TAC film in the same manner as in Example 1 to obtain a hardened layer. The resulting film was saponified in the same manner as in Comparative example 1 to obtain sample 28.

<Ultraviolet ray hardenable resin composition (D)>

| | |
|---|---|
| Acrylurethane resin (Trade name: UNIDICK produced by Dainihon ink Co., Ltd.) | 100 parts |
| Polyisocyanate compound (Trade name: COLONATE L produced by Nihon Polyurethane Co., Ltd.) | 1 part |
| UV initiator (Trade name: IRGACURE 184 produced by Ciba Geigy Co., Ltd.) | 5 parts |

The protective film samples obtained in Examples 1 to 7 and in Comparative examples 1 to 8 were evaluated according to the following evaluation method. The evaluation results of the protective film itself are shown in Tables 1 and 2, and the evaluation results of a combination of the protective film and the polarizing film, that is, a polarizing plate, are shown in Table 3.

An evaluation method will be shown below. <Evaluation of Protective Film Sample>

1. Scratch resistance of hardened layer a) Pencil hardness: Pencil hardness was measured applying a 100 g load according to JIS (Japanese Industry Standard) K5400.

The surface of the protective film sample was scratched with a lead of a pencil applying a 100 g load. The scratch resistance was evaluated by the lead hardness.

b) Steel wool hardness: The surface of the protective film sample was rubbed reciprocally 5 times with steel wool (#0000) at one reciprocation (30 mm) per second at an applying load of 100 g.

(Evaluation Criteria)

○: No scratches

Δ: 1 to 10 line scratches

X: 11 to 30 line scratches

XX: 31 or more line scratches

2. Glare resistance

Haze: Haze was measured employing a haze meter T-2600DA (produced by Tokyo Denshoku Kogyo Co., Ltd.) according to ISO 7823-1.

Glossiness: Glossiness was measured employing a digital polarization photometer type VG-ID (produced by Nihon Denshoku Kogyo Co., Ltd.) according to ISO 7823-1 (60° glossiness).

3. Adhesion of hardened layer to the support

The surface of the hardened layer was scratched at an angle of 90° with a single-edged blade at a depth to the film surface and 30 mm distant from one another. Then, a commercially available cellophane tape was adhered to the cut with its one edge unadhered, and strongly pressed on a curved plastic or metal plate. Thereafter, the unadhered tape edge was sharply peeled in the horizontal direction and the ratio of the peeled hardened layer area to the tape adhered area was evaluated.

A: No peeling of the hardened layer
B: The ratio was 10% or less.
C: The ratio was 10 to 30%.
D: The ratio was over 30%.

4. Flexibility

According to ISO 1519, the protective film sample was bent over a shaft having a diameter of 2 mm with the hardened layer located outside at an angle of 180°. The bent surface was visually evaluated.
(Evaluation Criteria)
  ○: No cracks
  Δ: Cracks occur
  X: Cracks occur with a crunching sound, when bent.

5. Blocking property

The film sample of 35 mm (width)×950 mm (length) was wound six turns around a core having a diameter of 50 mm applying a load of 1 kg. A two-sided adhesive tape of 30 mm (width)×5 mm (length) was adhered to the trailing edge of the film sample to hold the film steady.

The core was removed. The resulting roll of film was stored at 23° C. and 55% RH for 24 hours, and put on an electric balance with the periphery contacted. Then, the film was pressed at a rate of 10 mm per one minute from the above upper periphery and the stress was measured.

Next, the stress was measured for one-turned roll film.

The blocking of the samples was calculated by subtracting 6 times the stress of the one-turned rolled film from that of the six-turned rolled film.

Regarding the blocking, inventive samples 1 and 3 were compared with comparative sample 7, inventive samples 4 and 6 were compared with comparative sample 8, inventive samples 16 and 17 were compared with comparative sample 22, inventive samples 18 and 19 were compared with comparative sample 23, inventive samples 20 and 21 were compared with comparative sample 24, and inventive samples 25 and 26 were compared with comparative sample 27.

6. Durability

Employing the above prepared film samples, a polarizing plate was prepared according to the following method and cut into a 5×7 cm size. The resulting specimen was temporarily adhered with an acryl adhesive to the center of a 6×8 cm glass plate, and pressed to remove bubbles between the specimen and the glass plate.

The resulting samples were perpendicularly fixed at 80° C. and 95% RH for 1,000 hours separate from one another. Thereafter, (A) discoloration of the polarizing plate and (B) adhesion between the protective film and the polarizing film was evaluated.

(A) discoloration of the polarizing plate

The color difference ΔE (NBS unit) was measured using a color-difference meter produced by Suga Sikenki Co., Ltd.
  ○: 2 or less Material destruction occurred.
  Δ: 2 to 5
  X: 5 or more (B) Adhesion between the protective film and the polarizing film The polarizing plate was subjected to high humidity and temperature treatment, and the degree of separation between the protective film and the polarizing film was visually evaluated according to the following criteria:
(Evaluation Criteria)
  ○: The separation occurred at not more than 1 mm distant from the edges of the plate.
  Δ: The separation occurred at 1 to 5 mm distant from the edges of the plate.
  X: The separation occurred at not less than 5 mm distant from the edges of the plate.

7. Chemical resistance of hardened layer

A piece of gauze was immersed in each solvent as described in Table 1. The surface of the protective sample film was rubbed 10 times with the solvent soaked gauze, dried at ordinary temperature, and visually evaluated.
(Evaluation Criteria)
  ○: No change on the surface
  Δ: The surface turned slightly white.
  X: The surface turned white, and the film is of no practical use.

<Evaluation as Polarizing Plate>

Preparation of polarizing film

A 120 μm thick polyvinyl alcohol film was immersed in an aqueous solution containing 1 part of iodine, 2 parts of potassium iodide and 4 parts of boric acid, and stretched by a factor of 4 at 50° C. to obtain a polarizing film which was a uniaxially oriented dyed polyvinyl alcohol film.

Preparation of polarizing plate

The polarizing plate, in which a polarizing film was adhered to each of the protective film samples 1 through 28, was prepared according to the following processes (1) through (5):

(1) A 15×15 cm protective film was placed on a glass plate with its adhesion layer outside.

(2) A 15×15 cm polarizing film composed of a uniaxially oriented, dyed polyvinyl alcohol film was immersed for 1 to 2 seconds in an adhesive solution containing 2 wt % of polyvinyl alcohol.

(3) Any excess adhesive was removed from the above obtained polarizing film. The resulting polarizing film was superposed on the protective film obtained in (1) above, and an additional 15×15 cm protective film was further superposed on the above polarizing film in such a manner that the adhesion layer of the protective film contacted the polarizing film.

(4) Each film of the resulting material was adhered to the others with a hand roller at a pressure of 2 to 3 kg/cm$^2$ and at a roller speed of about 2 m/min., and any excess adhesive or bubbles were removed from the edges of the film.

(5) The resulting sample was dried for 5 minutes at 80° C. in a drier.

Thus, a polarizing plate was obtained. In the polarizing plate, the adhesion between the polarizing film and the protective film was evaluated according to the following:

1) Initial adhesion: The polarizing film was adhered to the protective film, and then peeled by hand, and the degree of material destruction was evaluated according to the following criteria:
(Evaluation Criteria)
  ○: Material destruction occurred.
  Δ: Partial material destruction occurred, and most part of the polarizing plate was separated between the protective film and the polarizing film.
  X: The polarizing plate was separated between the protective film and the polarizing film.

2) Processability: The polarizing plate was punched with a Dambell punching machine, and the degree of separation at the adhered part was evaluated according to the following criteria:
(Evaluation Criteria)

○: 0.1 mm or less

Δ: more than 0.1 mm to less 0.15 mm

X: 0.15 mm or more

TABLE 1

| | | | | Coating Composition | | | | |
| | | | Adhesive | UV Hardenable Resin Composition | | | Silica Fine | |
| | Sample | Support | layer | (A) | (B) | (D) | Particles (A) | Solvent |
|---|---|---|---|---|---|---|---|---|
| Example 1 | 1 | TAC | No | 30 | — | — | 0.45 | 70 |
| Example 1 | 2 | TAC | Yes | 30 | — | — | 0 | 70 |
| Example 1 | 3 | TAC | Yes | 30 | — | — | 0.45 | 70 |
| Example 2 | 4 | PC | No | — | 30 | — | 0.45 | 70 |
| Example 2 | 5 | PC | Yes | — | 30 | — | 0 | 70 |
| Example 2 | 6 | PC | Yes | — | 30 | — | 0.45 | 70 |
| Comparative example 1 | 7 | TAC | — | — | — | — | — | — |
| Comparative example 2 | 8 | PC | — | — | — | — | — | — |
| Example 4 | 16 | PAR | No | 30 | — | — | 0.45 | 70 |
| Example 4 | 17 | PAR | Yes | 30 | — | — | 0.45 | 70 |
| Example 5 | 18 | PET | No | — | 30 | — | 0.45 | 70 |
| Example 5 | 19 | PET | Yes | — | 30 | — | 0.45 | 70 |
| Example 6 | 20 | SPS | No | 30 | — | — | 0.45 | 70 |
| Example 6 | 21 | SPS | Yes | 30 | — | — | 0.45 | 70 |
| Comparative example 4 | 22 | PAR | — | — | — | — | — | — |
| Comparative example 5 | 23 | PET | — | — | — | — | — | — |
| Comparative example 6 | 24 | SPS | — | — | — | — | — | — |
| Example 7 | 25 | NRB | No | — | 30 | — | 0.45 | 70 |
| Example 7 | 26 | NRB | Yes | — | 30 | — | 0.45 | 70 |
| Example 7 | 27 | NRB | — | — | — | — | — | — |
| Example 8 | 28 | TAC | — | — | — | 30 | 0 | 70 |

In Table, the numerical value represents parts by weight.

| | Evaluation of Protective Film | | | | | | | | |
| | Scratch Resistance | | | | | | Chemical Resistance | | |
| | Pencil Hardness | Steel Wool Hardness | Haze (%) | Adhesion (1) | Adhesion (2) | Flexi-bility | Blocking (%) | Methanol | Methylethyl-ketone | Toluene |
|---|---|---|---|---|---|---|---|---|---|---|
| Example 1 | 6H | ○ | 0.1 | A | A | ○ | 18 | ○ | ○ | ○ |
| Example 1 | 6H | ○ | 0.1 | A | A | ○ | 100 | ○ | ○ | ○ |
| Example 1 | 6H | ○ | 0.1 | A | A | ○ | 15 | ○ | ○ | ○ |
| Example 2 | 6H | ○ | 0.1 | A | A | ○ | 13 | ○ | ○ | ○ |
| Example 2 | 6H | ○ | 0.1 | A | A | ○ | 100 | ○ | ○ | ○ |
| Example 2 | 6H | ○ | 0.1 | A | A | ○ | 20 | ○ | ○ | ○ |
| Comparative example 1 | H | XX | 0.1 | — | — | — | 100 | Δ | X | X |
| Comparative example 2 | H | XX | 0.1 | — | — | — | 100 | ○ | X | X |
| Example 4 | 6H | ○ | 0.1 | A | A | ○ | 17 | ○ | ○ | ○ |
| Example 4 | 6H | ○ | 0.5 | A | A | ○ | 13 | ○ | ○ | ○ |
| Example 5 | 6H | ○ | 0.1 | A | A | ○ | 15 | ○ | ○ | ○ |
| Example 5 | 6H | ○ | 0.3 | A | A | ○ | 9 | ○ | ○ | ○ |
| Example 6 | 6H | ○ | 0.1 | A | A | ○ | 17 | ○ | ○ | ○ |
| Example 6 | 6H | ○ | 0.3 | A | A | ○ | 13 | ○ | ○ | ○ |
| Comparative example 4 | 2H | XX | 0.1 | — | — | — | 100 | ○ | X | Δ |
| Comparative example 5 | 2H | XX | 0.1 | — | — | — | 100 | ○ | ○ | ○ |
| Comparative example 6 | H | XX | 0.1 | — | — | — | 100 | ○ | Δ | X |
| Example 7 | 6H | ○ | 0.1 | A | A | ○ | 10 | ○ | ○ | ○ |
| Example 7 | 6H | ○ | 0.3 | A | A | ○ | 9 | ○ | ○ | ○ |
| Example 7 | H | XX | 0.1 | — | — | — | 100 | Δ | X | X |
| Example 8 | 3H | Δ | 0.1 | C | C | X | 100 | ○ | ○ | ○ |

TABLE 2

| | | | Coating Composition | | | | |
|---|---|---|---|---|---|---|---|
| | | | UV Hardenable Resin Composition | | Silica Fine | Silicone Resin | |
| | Sample | Support | (A) | (C) | Particles (B) | Fine Particles | Solvent |
| Example 3 | 9 | TAC | 30 | — | 0.55 | — | 70 |
| Example 3 | 10 | TAC | 30 | — | 0.75 | — | 70 |
| Example 3 | 11 | TAC | 30 | — | 1.2 | — | 70 |
| Example 3 | 12 | TAC | 30 | — | — | 0.42 | 70 |
| Example 3 | 13 | TAC | 30 | — | — | 0.75 | 70 |
| Example 3 | 14 | TAC | 30 | — | — | 1.2 | 70 |
| Comparative Example 3 | 15 | TAC | — | 30 | — | — | 70 |

| | Evaluation of Protective Film | | | | | | | | | |
|---|---|---|---|---|---|---|---|---|---|---|
| | Scratch Resistance | | | | | | | Chemical Resistance | | |
| | Pencil Hardness | Steel Wool Hardness | Glare Resistance | | Adhesion | | Flexibility | Methanol | Methyl ethyl ketone | Toluene |
| | | | Haze (%) | Glossiness (%) | (1) | (2) | | | | |
| Example 3 | 6H | ○ | 4.1 | 64 | A | A | ○ | ○ | ○ | ○ |
| Example 3 | 6H | ○ | 7.0 | 49 | A | A | ○ | ○ | ○ | ○ |
| Example 3 | 6H | ○ | 10.4 | 38 | A | A | ○ | ○ | ○ | ○ |
| Example 3 | 6H | ○ | 2.4 | 89 | A | A | ○ | ○ | ○ | ○ |
| Example 3 | 6H | ○ | 4.6 | 56 | A | A | ○ | ○ | ○ | ○ |
| Example 3 | 6H | ○ | 8.5 | 42 | A | A | ○ | ○ | ○ | ○ |
| Comparative example 3 | 3H | ○ | 0.1 | 150 | C | C | X | ○ | ○ | ○ |

TABLE 3

| Protective Film Sample | | Adhesion | | | |
|---|---|---|---|---|---|
| | | Initial | | Durability | |
| | | Adhesion | Processability | A | B |
| 1 | Example 1 | ○ | ○ | ○ | ○ |
| 2 | Example 1 | ○ | ○ | ○ | ○ |
| 3 | Example 2 | ○ | ○ | ○ | ○ |
| 4 | Example 2 | ○ | ○ | ○ | ○ |
| 5 | Comparative Example 1 | ○ | ○ | ○ | Δ |
| 6 | Comparative Example 2 | ○ | Δ | X | X |
| 7 | Example 3 | ○ | ○ | ○ | ○ |
| 8 | Example 3 | ○ | ○ | ○ | ○ |
| 9 | Example 3 | ○ | ○ | ○ | ○ |
| 10 | Example 3 | ○ | ○ | ○ | ○ |
| 11 | Example 3 | ○ | ○ | ○ | ○ |
| 12 | Example 3 | ○ | ○ | ○ | ○ |
| 13 | Comparative Example 3 | ○ | ○ | ○ | Δ |
| 17 | Example 4 | ○ | ○ | ○ | ○ |
| 19 | Example 5 | ○ | ○ | ○ | ○ |
| 21 | Example 6 | ○ | ○ | ○ | ○ |
| 22 | Comparative Example 4 | X | X | X | X |
| 23 | Comparative Example 5 | X | X | X | X |
| 24 | Comparative Example 6 | X | X | X | X |
| 26 | Example 7 | ○ | ○ | ○ | ○ |
| 27 | Comparative Example 7 | X | X | X | X |
| 28 | Comparative Example 8 | ○ | ○ | ○ | Δ |

As is apparent from Tables 1, 2 and 3, the protective film of the present invention for a polarizing plate is excelent in scratch, chemical and glare resistance, and when an adhesion layer is provided on a protective film and then the polarizing plate comprised of the protective film and a polarizing film is prepared, it is recognized that the protective film has an excellent adhesion to a polarizing film and excellent durability without saponification treatment.

What is claimed is:

1. A polarizing plate comprising a polarizing film and a protective film, said protective film including a resin film, a first layer comprising a polyol acrylate resin on one side of said resin film and a second layer on another side of said resin film, opposite said first layer, said second layer being in contact with said polarizing film, said second layer comprising a hydrophilic polymer represented by the following Formula (1):

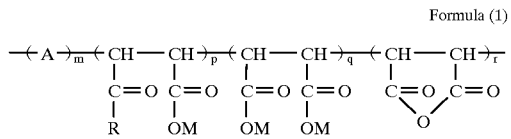

Formula (1)

wherein A represents a vinyl monomer; R represents —OR' or —N(R') (R'') in which R' represents an alkyl group an aralkyl group, an aryl group, a heterocyclic residue or a non-metallic atomic group necessary to form a heterocyclic ring toaether with R'', and R'' represents a hydrogen atom, an alkyl group having not more than 8 carbon atoms atom or a non-metallic atomic group necessary to form a heterocyclic ring together with R'; M represents a hydrogen atom or a cation; and m, c, g, and r independently represent mol %, in which m is 0 to 60, p is 0 to 100, q is 0 to 100, and r is 0 to 100.

2. The polarizing plate of claim 1 wherein the polyol acrylate resin is hardened by ultraviolet ray.

3. The polarizing plate of claim 1 wherein the resin film is transparent.

4. The polarizing plate of claim 1 wherein the polyol acrylate resin is dipentaerythritol hexaacrylate.

5. The polarizing plate of claim 1 wherein the dipentaerythritol hexaacrylate is hardened by ultraviolet ray.

6. The polarizing plate of claim 1 wherein the hidrophilic polymer is a vinyl acetate-maleic acid copolymer.

7. The polarizing plate of claim 1 wherein the first layer further contains a UV absorbent or an antioxidant.

8. The polarizing plate of claim 1, wherein said first layer contains fine particles, which are inorganic or organic, with an averaue volume diameter of 0.01 to 10 μm.

9. The polarizing plate of claim 8 wherein there are 0.1 to 20 parts by weight of said fine particles based on the 100 parts by weight of said first layer.

10. The polarizing plate of claim 1 wherein said vinyl monomer is selected from the group consisting of styrene; styrene having a substituent selected from the group consisting of nitro, fluorine, chlorine, bromine, chloromethyl, and lower alkyl; vinylmethyl ether; vinylethyl ether; vinylchloroethyl ether; vinylacetate; vinylchloroacetate; vinyl propionate; unsaturated acids; alkyl acrylate or methacrylate having 1 to 5 carbon atoms; alkyl acrylate or methacrylate having a substituent selected from the group consisting of chlorine or phenyl; phenylacrylate or methacrylate; phenyl acrylate or methacrylate having a substituent selected from the group consisting of chlorine and phenyl; acrylonitrile; vinyl chloride; vinylidene chloride; ethylene; acrylamide; acrylamide having a substituent selected from the group consisting of alkyl having 1 to 5 carbon atoms, chlorine and phenyl; vinyl alcohol; glycidyl acrylate; and acrolein.

11. The polarizing plate of claim 10 wherein said unsaturated acid is selected from the group consisting of acrylic acid, methacrylic acid, and itaconic acid.

12. The polarizing plate of claim 10 wherein said vinyl monomer is selected from the group consisting of styrene; styrene having a substituent selected from the group consisting of nitro, fluorine, chlorine, bromine, chloromethyl, and lower alkyl; vinyl methyl ether; vinyl acetate; alkyl acrylate having 1 to 5 carbon atoms; alkyl acrylate having a substituent selected from the group consisting of chlorine and phenyl; and acrylonitrile.

13. The polarizing plate of claim 1 wherein said R' is a substituted or unsubstituted, straight or branched chain, or cyclic alkyl having 1 to 24 carbon atoms.

14. The polarizing plate of claim 1 wherein said polyol acrylate is dipentaerythritol hexaacrylate, and said hydrophilic polymer is a vinyl acetate-maleic acid copolymer.

15. The polarizing plate of claim 1 wherein said second layer comprises said hydrophilic polymer in an amount of 10 to 1000 mg/m².

16. The polarizing plate of claim 1 wherein a weight average molecular weight of said hydrophilic polymer is 500 to 500,000.

17. A polarizing plate comprising a polarizing film and a protective film, said protective film including a resin film, a first layer comprising a polyol acrylate resin on one side of said resin film and a second layer on another side of said resin film, opposite said first layer, said second layer being in contact with said polarizing film, said second layer comprising a hydrophilic polymer represented by the following Formula (1):

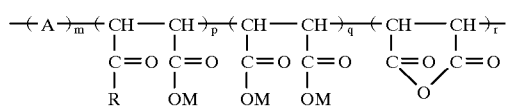

wherein A is a vinyl monomer selected from the group consisting of styrene; styrene having a substituent selected from the group consisting of nitro, fluorine, chlorine, bromine, chloromethyl, and lower alkyl; vinylmethyl ether; vinylethyl ether; vinylchloroethyl ether; vinyl acetate; vinyl chloroacetate; vinyl propionate; acrylic acid; methacrylic acid; itaconic acid; alkyl acrylate or alkyl methacrylate in which the alkyl represents an unsubstituted alkyl group of 1 to 5 carbon atoms or an alkyl group having a chlorine atom or a phenyl group; a phenyl acrylate or phenyl methacrylate in which the phenyl represents an unsubstituted phenyl group or a phenyl group having a chlorine atom or a phenyl group; acrylonitrile; vinyl chloride; vinylidene chloride; ethylene; acrylamide; an acrylamide having a substituent selected from the group consisting of an alkyl group of 1 to 5 carbon atoms, a chlorine atom and a phenyl group; vinyl alcohol; glycidyl acrylate; and acrolein; R represents —OR' or —N(R')(R") in which R' represents an alkyl group, an aralkyl group, an aryl group, a heterocyclic residue or a non-metallic atomic group necessary to form a heterocyclic ring together with R", and R" represents a hydrogen atom, an alkyl group having not more than 8 carbon atoms atom or a non-metallic atomic group necessary to form a heterocyclic ring together with R'; M represents a hydrogen atom or a cation; and m, p, q, and r independently represent mol %, in which m is 0 to 60, p is 0 to 100, q is 0 to 100, and r is 0 to 100.

18. The polarizing plate of claim 17, wherein said vinyl monomer is selected from the group consisting of styrene; styrene having a substituent selected from the group consisting of nitro, fluorine, chlorine, bromine, chloromethyl, and lower alkyl; vinylmethyl ether; vinyl acetate; vinyl chloroacetate; alkyl acrylate in which the alkyl represents unsubstituted alkyl with 1 to 5 carbon atoms or alkyl having a chlorine atom or a phenyl group; and acrylonitrile.

19. A protective film for a polarizing plate comprising a resin film, a first layer comprising a polyol acrylate resin on one side of said resin film and a second layer on another side of said resin film, opposite said first layer, said second layer comprising a hydrophilic polymer represented by the following Formula (1):

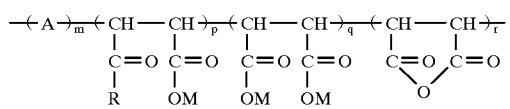

wherein A is a vinyl monomer; R represents —OR' or —N(R') (R") in which R' represents an alkyl group, an aralkyl group, an aryl group, a heterocyclic residue or a non-metallic atomic group necessary to form a heterocyclic ring together with R", and R" represents a hydrogen atom, an alkyl group having not more than 8 carbon atoms atom or a non-metallic atomic group necessary to form a heterocyclic ring together with R'; M represents a hydrogen atom or a cation; and m, p, q, and r independently represent mol %, in which m is 0 to 60, p is 0 to 100, q is 0 to 100, and r is 0 to 100.

* * * * *